US012583631B2

(12) United States Patent
Tamada

(10) Patent No.: US 12,583,631 B2
(45) Date of Patent: Mar. 24, 2026

(54) FLYING OBJECT

(71) Applicant: HONDA MOTOR CO., LTD., Tokyo (JP)

(72) Inventor: Shunichiro Tamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/206,219

(22) Filed: May 13, 2025

(65) Prior Publication Data

US 2025/0361040 A1 Nov. 27, 2025

(30) Foreign Application Priority Data

May 22, 2024 (JP) ................................. 2024-083188

(51) Int. Cl.
B64U 10/25 (2023.01)
B64C 9/32 (2006.01)
B64U 101/47 (2023.01)

(52) U.S. Cl.
CPC .............. B64U 10/25 (2023.01); B64C 9/323 (2013.01); *B64U 2101/47* (2023.01)

(58) Field of Classification Search
CPC .... B64C 9/08; B64C 9/30; B64C 9/32; B64C 9/323; B64C 9/326; B64C 9/34; B64C 9/36; B64C 9/38; B64C 13/0425; B64C 2009/005; B64U 10/25; B64U 40/10; B64U 2101/47
USPC .......................................................... 244/113
See application file for complete search history.

(56) References Cited

U.S. PATENT DOCUMENTS

| | | | | |
|---|---|---|---|---|
| 1,845,960 | A | * | 2/1932 | Daniell .................... B64C 9/323 |
| | | | | 244/113 |
| 2,418,273 | A | * | 4/1947 | Moore ..................... B64C 13/00 |
| | | | | 244/113 |
| 3,721,406 | A | * | 3/1973 | Hurlbert ................. B64C 9/323 |
| | | | | 244/110 B |
| 4,182,503 | A | * | 1/1980 | Muscatell ................. B64C 3/48 |
| | | | | 244/113 |
| 4,566,657 | A | * | 1/1986 | Grow ......................... B64C 9/32 |
| | | | | 244/113 |

(Continued)

FOREIGN PATENT DOCUMENTS

| | | |
|---|---|---|
| DE | 1943037 A1 | 3/1971 |
| JP | H07-132891 A | 5/1995 |

(Continued)

OTHER PUBLICATIONS

Office Action dated Nov. 11, 2025 issued in the corresponding Japanese Patent Application No. 2024-083188 with the English machine translation thereof.

*Primary Examiner* — Joshua E Rodden
(74) *Attorney, Agent, or Firm* — Carrier, Shende & Associates P.C.; Joseph P. Carrier; Filchand P. Shende

(57) ABSTRACT

A flying object includes: a fuselage; a wing that extends laterally from the fuselage and can generate lift during cruising; and a thrust generation unit that can generate thrust. The wing includes a fixed wing portion fixed to the fuselage, and a deployable wing portion deployable forward in a front-rear direction from the fixed wing portion, and a plane area of the wing in a deployed state in which the deployable wing portion is deployed forward in the front-rear direction is larger than a plane area of the wing in a superposed state in which the deployable wing portion is superposed on the fixed wing portion.

12 Claims, 6 Drawing Sheets

(56) References Cited

U.S. PATENT DOCUMENTS

| | | | | |
|---|---|---|---|---|
| 5,895,015 A * | 4/1999 | Saiz | ..................... | B64C 9/323 |
| | | | | 416/135 |
| 7,740,205 B1 * | 6/2010 | Nahas | ..................... | B64C 9/20 |
| | | | | 244/45 R |
| 8,613,409 B2 * | 12/2013 | Cazals | .................. | B64C 9/323 |
| | | | | 244/90 R |
| 11,014,646 B2 * | 5/2021 | Mackin | .................. | B64C 9/323 |
| 2003/0091436 A1 * | 5/2003 | Stiesdal | .............. | F03D 7/0252 |
| | | | | 416/1 |
| 2020/0062391 A1 * | 2/2020 | Hefner | .................. | B64U 10/25 |
| 2020/0130831 A1 * | 4/2020 | Luca | ..................... | B64C 5/12 |
| 2025/0115349 A1 * | 4/2025 | Castrichini | ............ | B64C 9/323 |

FOREIGN PATENT DOCUMENTS

| | | | |
|---|---|---|---|
| JP | 2018-086916 A | 6/2018 |
| JP | 2021-062794 A | 4/2021 |

* cited by examiner

RIGHT
FRONT
UP
REAR
LEFT
DOWN

FRONT ← → REAR

DOWN

FLYING OBJECT

CROSS-REFERENCE TO RELATED APPLICATIONS

This application is based upon and claims the benefit of priority from Japanese Patent Application No. 2024-083188 filed on May 22, 2024, the contents of which are incorporated herein by reference.

BACKGROUND OF THE INVENTION

Field of the Invention

The present disclosure relates to a flying object.

Description of the Related Art

JP 2021-062794 A discloses an unmanned aerial vehicle (UAV) used for a variety of applications.

SUMMARY OF THE INVENTION

There is a demand for a flying object that can fly suitably. The present disclosure has the object of solving the above-described problem.

According to an aspect of the present disclosure, there is provided a flying object comprising: a fuselage; a wing extending laterally from the fuselage and configured to generate lift during cruising; and a thrust generation unit configured to generate thrust, wherein the wing includes a fixed wing portion fixed to the fuselage, and a deployable wing portion deployable forward in a front-rear direction from the fixed wing portion, and an area of a planform of the wing in a deployed state in which the deployable wing portion is deployed forward in the front-rear direction is larger than an area of the planform of the wing in a superposed state in which the deployable wing portion is superposed on the fixed wing portion.

According to the present disclosure, it is possible to provide a flying object that can fly suitably.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a schematic configuration diagram of a wing;

DETAILED DESCRIPTION OF THE INVENTION

As a flight mode of a flying object, there is a mode in which, after flying in the horizontal direction to the sky above a destination, the flying object is caused to descend substantially vertically toward the ground from the sky above the destination. In order to cause the flying object to descend substantially vertically, it is preferable to suppress the descending speed of the flying object. The present disclosure described below enables the speed of the flying object descending downward in the vertical direction to be suppressed.

1. OVERALL CONFIGURATION OF FLYING OBJECT 10

Figure 1:
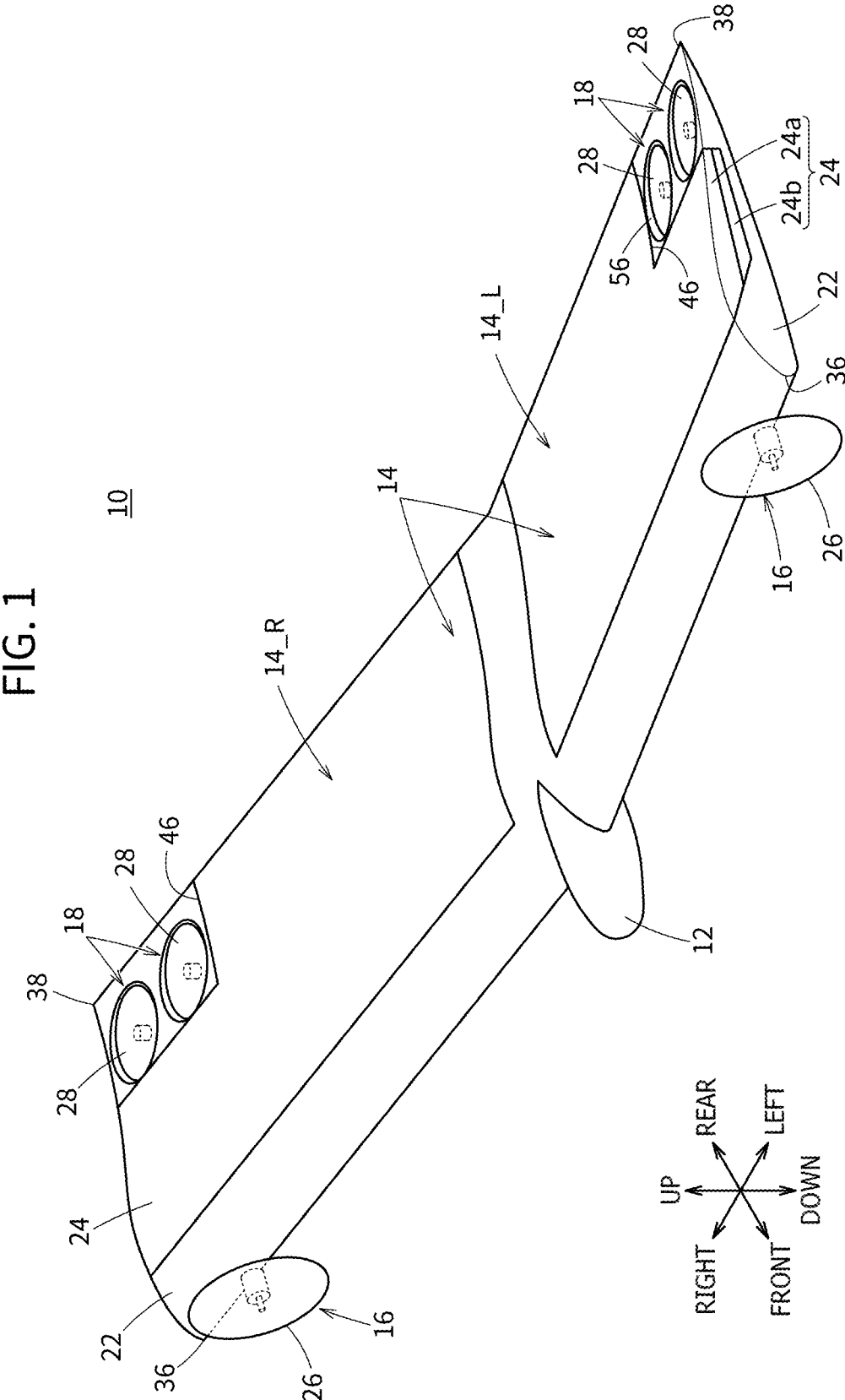
FIG. 1 is a schematic perspective view of a flying object according to the present embodiment.
Figure 2:
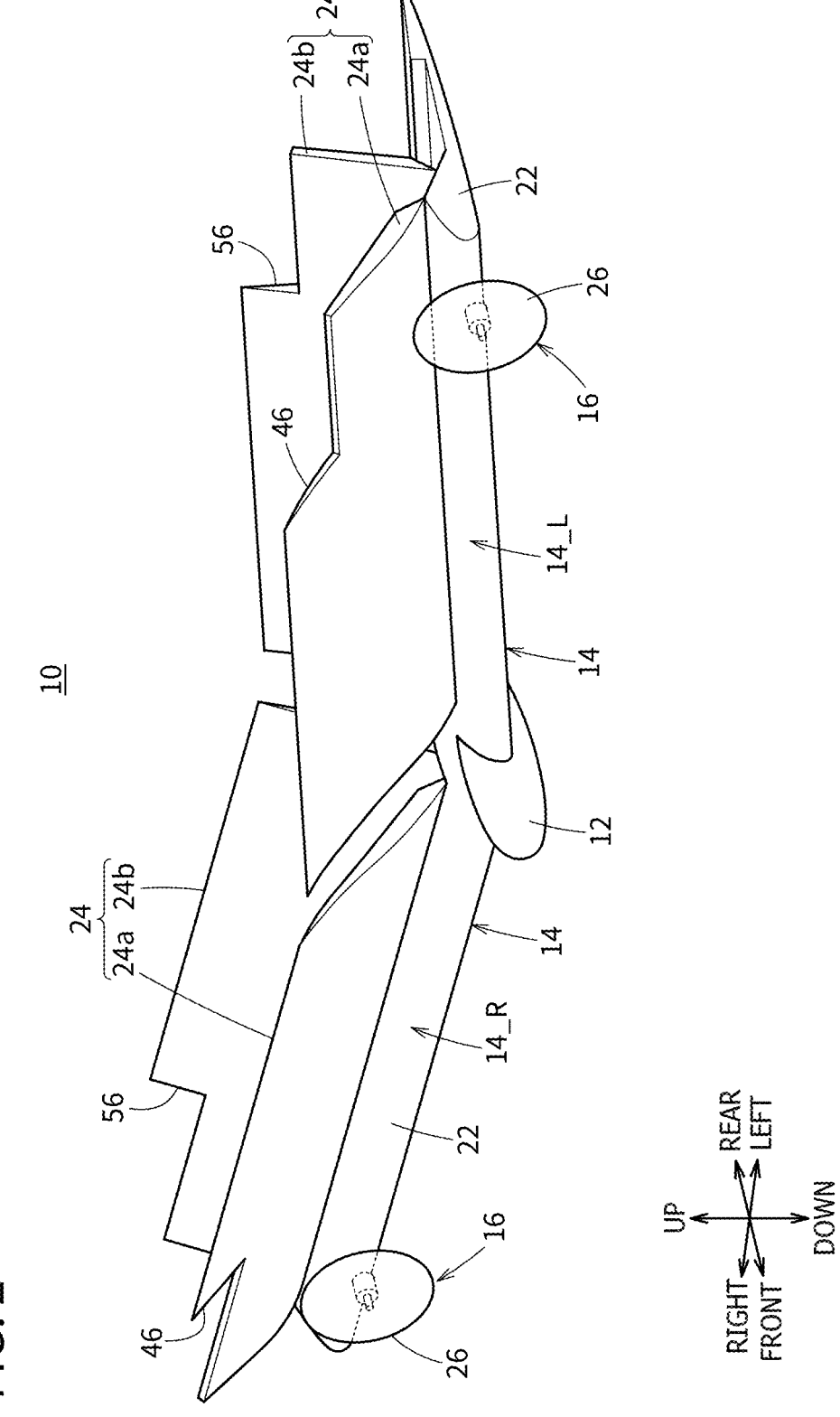
FIG. 2 is a schematic perspective view of the flying object according to the present embodiment.

FIGS. 1 and 2 are schematic perspective views of a flying object 10 according to the present embodiment. FIG. 1 shows the flying object 10 in a state in which a fixed wing portion 22 and a deployable wing portion 24 are superposed on each other. FIG. 2 shows the flying object 10 in a state in which the deployable wing portion 24 is deployed from the fixed wing portion 22. The perspective view shown in FIG. 1 and the perspective view shown in FIG. 2 are different in the angle at which the flying object 10 is viewed.

The flying object 10 according to the present embodiment is an unmanned aerial vehicle (UAV). The flying object 10 may be capable of flying by remote control by an operator or may be capable of autonomously flying. The flying object 10 can transport an article. For example, the flying object 10 can transport a bag containing water to the sky above a fire site and can sprinkle water on the fire site. It should be noted that the flying object 10 may be a manned aerial vehicle.

The flying object 10 includes a fuselage 12. The fuselage 12 includes a holder (not shown) for holding an article to be transported. It should be noted that the fuselage 12 may be capable of storing therein an article to be transported.

The flying object 10 includes wings 14. A left wing 14_L among the wings 14 extends in the left direction (laterally) from the fuselage 12. A right wing 14_R among the wings 14 extends in the right direction (laterally) from the fuselage 12. The wings 14 can generate lift when the flying object 10 is cruising (flying in the horizontal direction).

As shown in FIG. 2, the wings 14 (the left wing 14_L and the right wing 14_R) each include the fixed wing portion 22 and the deployable wing portion 24. Further, the deployable wing portion 24 includes a first deployable wing portion 24a and a second deployable wing portion 24b. The wings 14 will be described in detail later.

The flying object 10 includes, for example, two thrust generation units 16. One of the two thrust generation units 16 is provided on the left wing 14_L. The other of the two thrust generation units 16 is provided on the right wing 14_R. Each of the thrust generation units 16 includes a propeller 26 and an electric motor (not shown). The propeller 26 is connected to the electric motor via a propeller shaft (not shown). The propeller shaft extends in the front-rear direction. The electric motor can be operated by electric power supplied from a battery (not shown). The propeller 26 of the thrust generation unit 16 provided on the left wing 14_L is disposed forward of the fixed wing portion 22 of the left wing 14_L. The propeller 26 of the thrust generation unit 16 provided on the right wing 14_R is disposed forward of the fixed wing portion 22 of the right wing 14_R. Each thrust generation unit 16 can generate forward thrust in the front-rear direction when the flying object 10 is cruising. It should be noted that one or more thrust generation units 16 may be disposed on the fuselage 12 instead of disposing one thrust generation unit 16 on each of the left wing 14_L and the right wing 14_R.

The flying object 10 includes, for example, two sets of attitude control units 18. One of the two sets of the attitude control units 18 is provided in the left wing 14_L. The other of the two sets of the attitude control units 18 is provided in the right wing 14_R. Each of the attitude control units 18 includes a propeller 28 and an electric motor (not shown). The propeller 28 is connected to the electric motor via a propeller shaft (not shown). The propeller shaft extends in the up-down direction (vertical direction). The electric motor can be operated by electric power supplied from a battery (not shown). The propellers 28 of the attitude control units 18 provided in the left wing 14_L are disposed in the fixed wing portion 22 of the left wing 14_L. The propellers 28 of the attitude control units 18 provided in the right wing 14_R are disposed in the fixed wing portion 22 of the right wing 14_R. Each of the attitude control units 18 can generate upward thrust in the vertical direction when the flying object 10 is cruising. The attitude control units 18 are each used when controlling the pitch angle of the flying object 10 and the roll angle of the flying object 10.

2. CONFIGURATION OF WINGS 14

Figure 3:
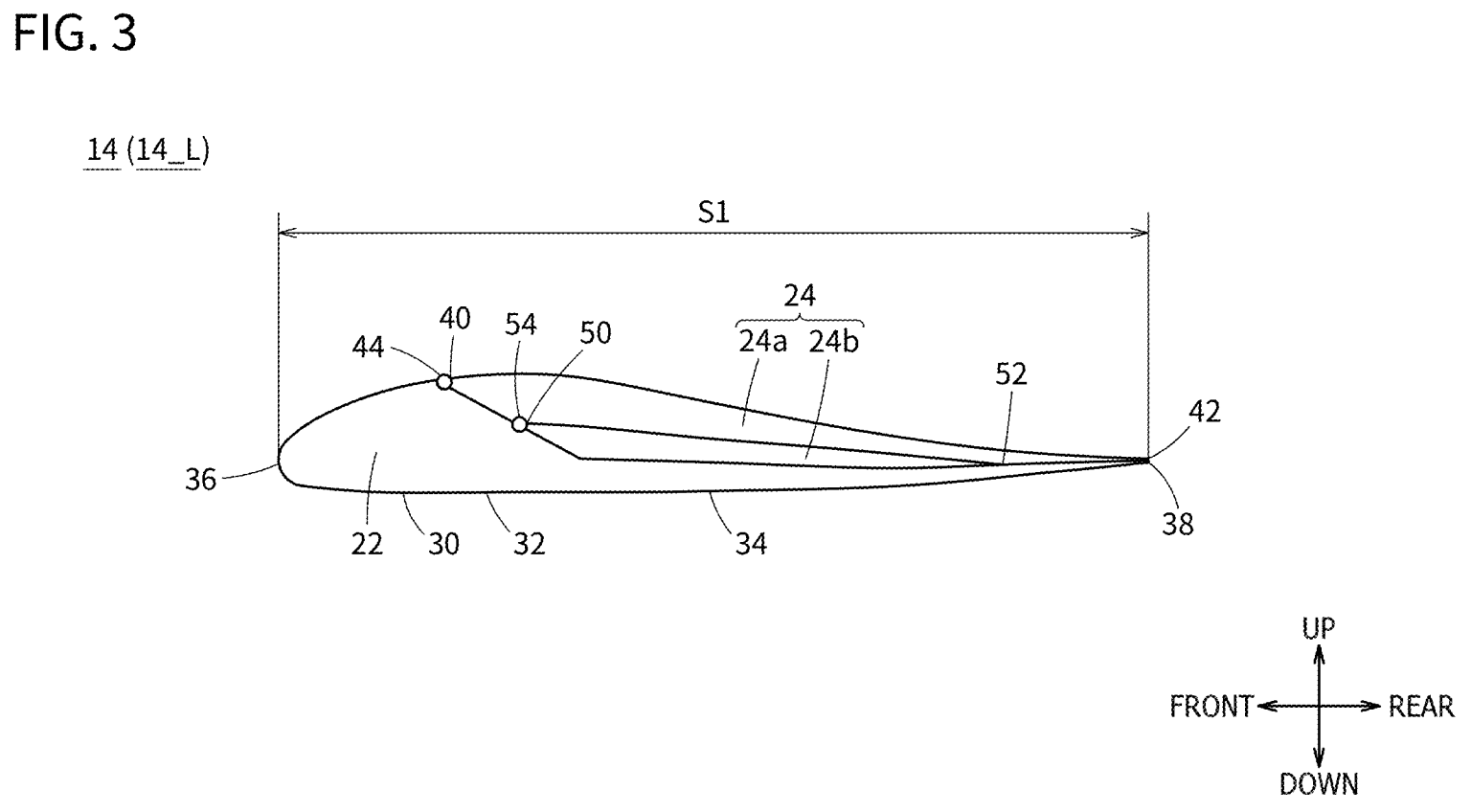
Figure 4:
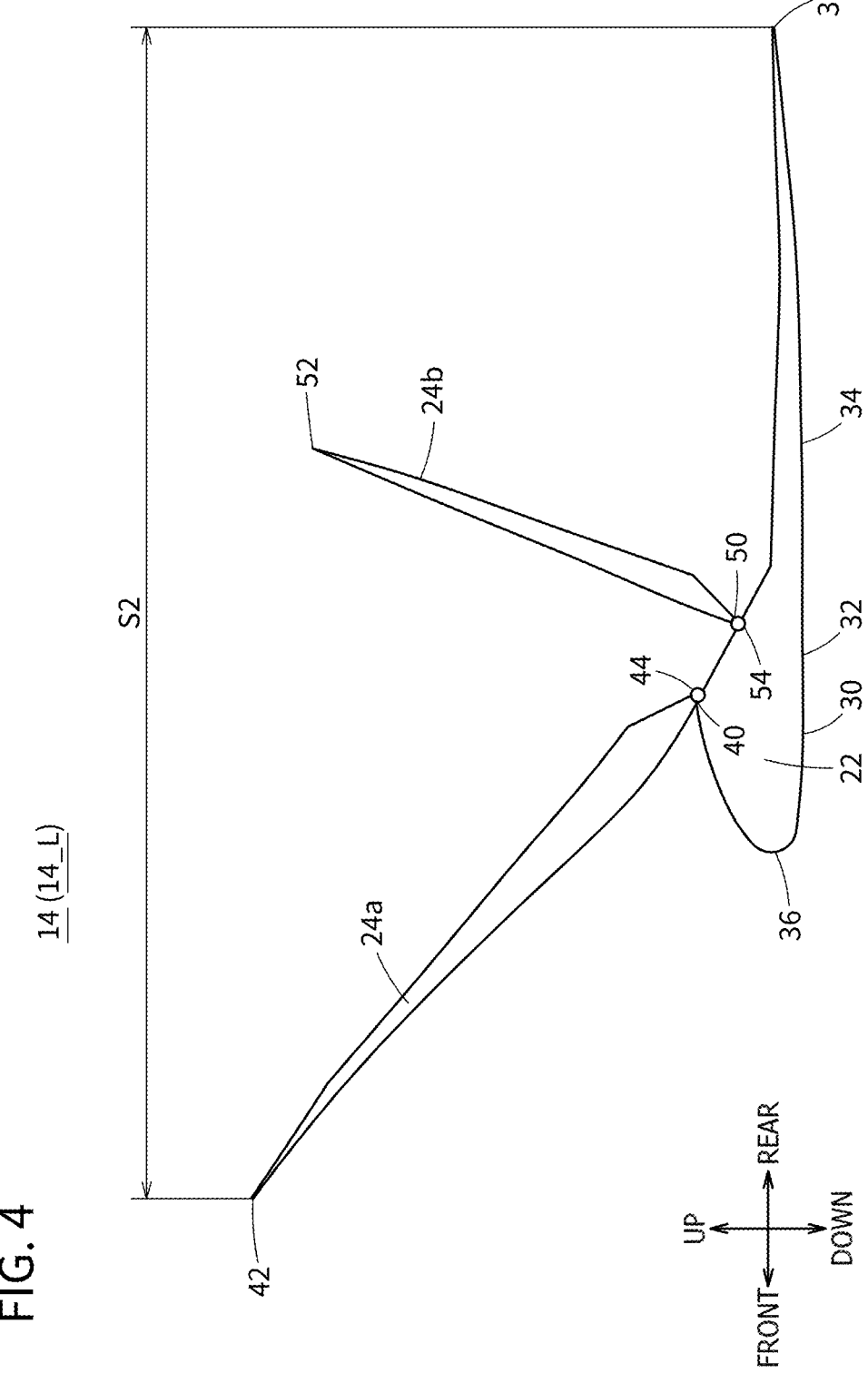
FIG. 4 is a schematic configuration diagram of the wing.

FIGS. 3 and 4 are schematic configuration diagrams of each wing 14. FIGS. 3 and 4 schematically show the left wing 14_L as viewed from the side. FIG. 3 shows the wing 14 of the flying object 10 in the state shown in FIG. 1. FIG. 4 shows the wing 14 of the flying object 10 in the state shown in FIG. 2.

As shown in FIGS. 3 and 4, the wing 14 can be brought into the following superposed state or into the following deployed state. In the present specification, as shown in FIG. 3, a state in which the deployable wing portion 24 is superposed on the fixed wing portion 22 is referred to as a superposed state. Further, in the present specification, as shown in FIG. 4, a state in which the deployable wing portion 24 is deployed forward in the front-rear direction is referred to as a deployed state. A plane area S2 (FIG. 4) of the wing 14 in the deployed state is larger than a plane area S1 (FIG. 3) of the wing 14 in the superposed state.

As shown in FIG. 3, in the superposed state, the deployable wing portion 24 is superposed on the fixed wing portion 22. Specifically, the second deployable wing portion 24b is superposed on the fixed wing portion 22, and the first deployable wing portion 24a is superposed on the second deployable wing portion 24b.

As shown in FIG. 1, the fixed wing portion 22 is fixed to the fuselage 12. The fixed wing portion 22 has the same planform as the wing 14. As shown in FIGS. 3 and 4, the fixed wing portion 22 includes a thick part 30, an inclined part 32, and a thin part 34. The thick part 30 is located forward of the inclined part 32 and the thin part 34. The thick part 30 includes a leading edge 36 of the fixed wing portion 22. The thick part 30 is relatively thick in the fixed wing portion 22. The thin part 34 is located rearward of the thick part 30 and the inclined part 32. The thin part 34 includes a trailing edge 38 of the fixed wing portion 22. The thin part 34 is relatively thin in the fixed wing portion 22. The inclined part 32 is located between the thick part 30 and the thin part 34. The inclined part 32 is gradually reduced in thickness from the front end toward the rear end thereof. The upper surface of the inclined part 32 is inclined from the thick part 30 toward the thin part 34.

The first deployable wing portion 24a of the deployable wing portion 24 is rotatably connected to the fixed wing portion 22. For example, a proximal end 40 of the first deployable wing portion 24a is connected to the upper surface of the thick part 30 of the fixed wing portion 22 or the upper surface of the inclined part 32 of the fixed wing portion 22 by one or more hinges 44 or the like. The hinge shaft (rotation shaft) extends in the width direction of the fuselage 12. For example, the hinge shaft may be parallel to the width direction of the fuselage 12 or the longitudinal direction of the wing 14, or may be inclined with respect to the width direction of the fuselage 12 or the longitudinal direction of the wing 14. As shown in FIG. 4, the first deployable wing portion 24a can be deployed forward in the front-rear direction from the fixed wing portion 22 by rotating about the hinge shaft (the proximal end 40).

The second deployable wing portion 24b of the deployable wing portion 24 is rotatably connected to the fixed wing portion 22. For example, a proximal end 50 of the second deployable wing portion 24b is connected to the upper surface of the inclined part 32 of the fixed wing portion 22 by one or more hinges 54 or the like. The hinge shaft (rotation shaft) extends in the width direction of the fuselage 12. For example, the hinge shaft may be parallel to the width direction of the fuselage 12 or the longitudinal direction of the wing 14, or may be inclined with respect to the width direction of the fuselage 12 or the longitudinal direction of the wing 14. As shown in FIG. 4, the second deployable wing portion 24b can be deployed forward in the front-rear direction from the fixed wing portion 22 by rotating about the hinge shaft (the proximal end 50).

It should be noted that, as shown in FIG. 1, the attitude control units 18 are provided in the fixed wing portion 22. Further, as shown in FIGS. 1 and 2, a cutout 46 is formed in the first deployable wing portion 24a so as not to cover the upper side of the attitude control units 18. In the same manner as in the first deployable wing portion 24a, a cutout 56 is formed in the second deployable wing portion 24b so as not to cover the upper side of the attitude control units 18.

The wing 14 may have a configuration other than the above-described configuration. For example, the deployable wing portion 24 may be superposed under the fixed wing portion 22. Moreover, the deployable wing portion 24 may include only one wing instead of two wings (the first deployable wing portion 24a and the second deployable wing portion 24b). Further, the first deployable wing portion 24a may be deployed forward in the front-rear direction from the fixed wing portion 22 by sliding forward in the front-rear direction. Furthermore, the attitude control units 18 may be provided in the deployable wing portion 24. In this case, a cutout is formed in the fixed wing portion 22 so as not to cover the attitude control units 18. It should be noted that the flying object 10 illustrated in FIG. 1 is a tailless aircraft, but may have a tail.

3. STATE OF WING 14 WHEN FLYING OBJECT 10 IS FLYING

Figure 5:
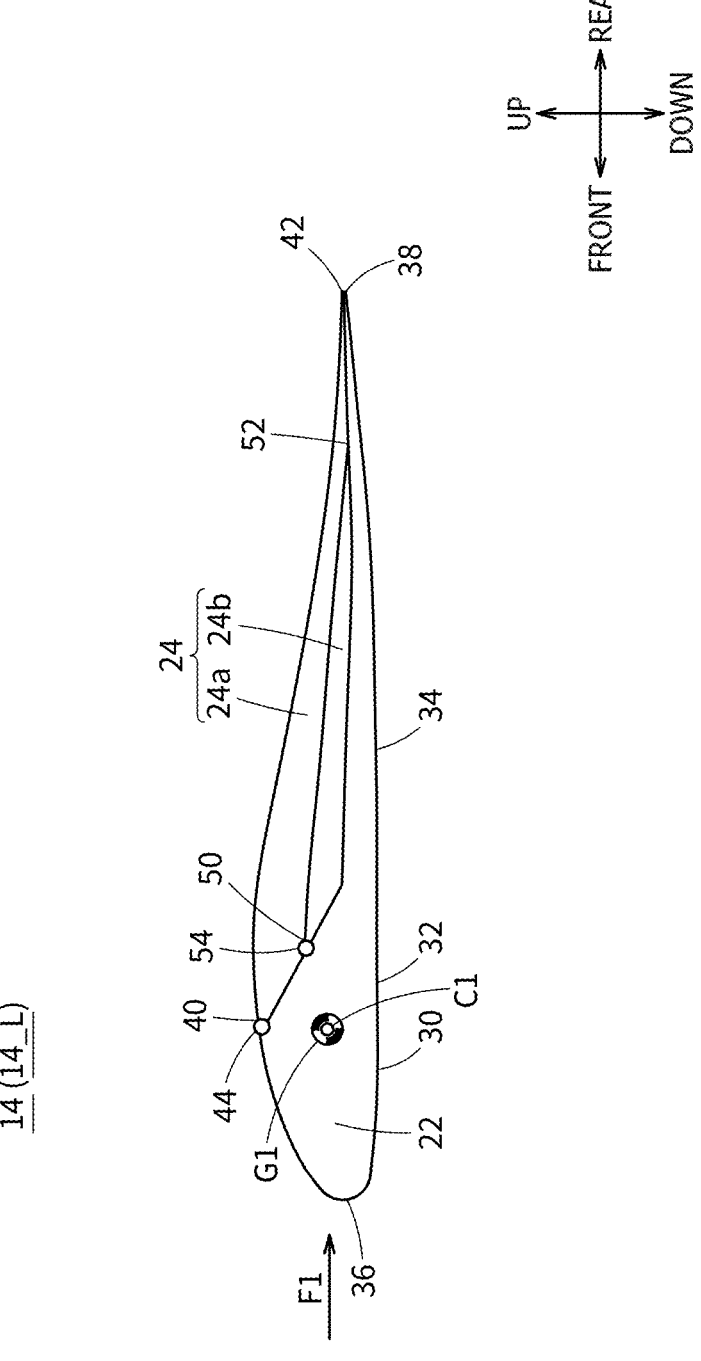
FIG. 5 is a diagram showing the state of the wing in the case where the flying object is flying in the horizontal direction.
Figure 6:
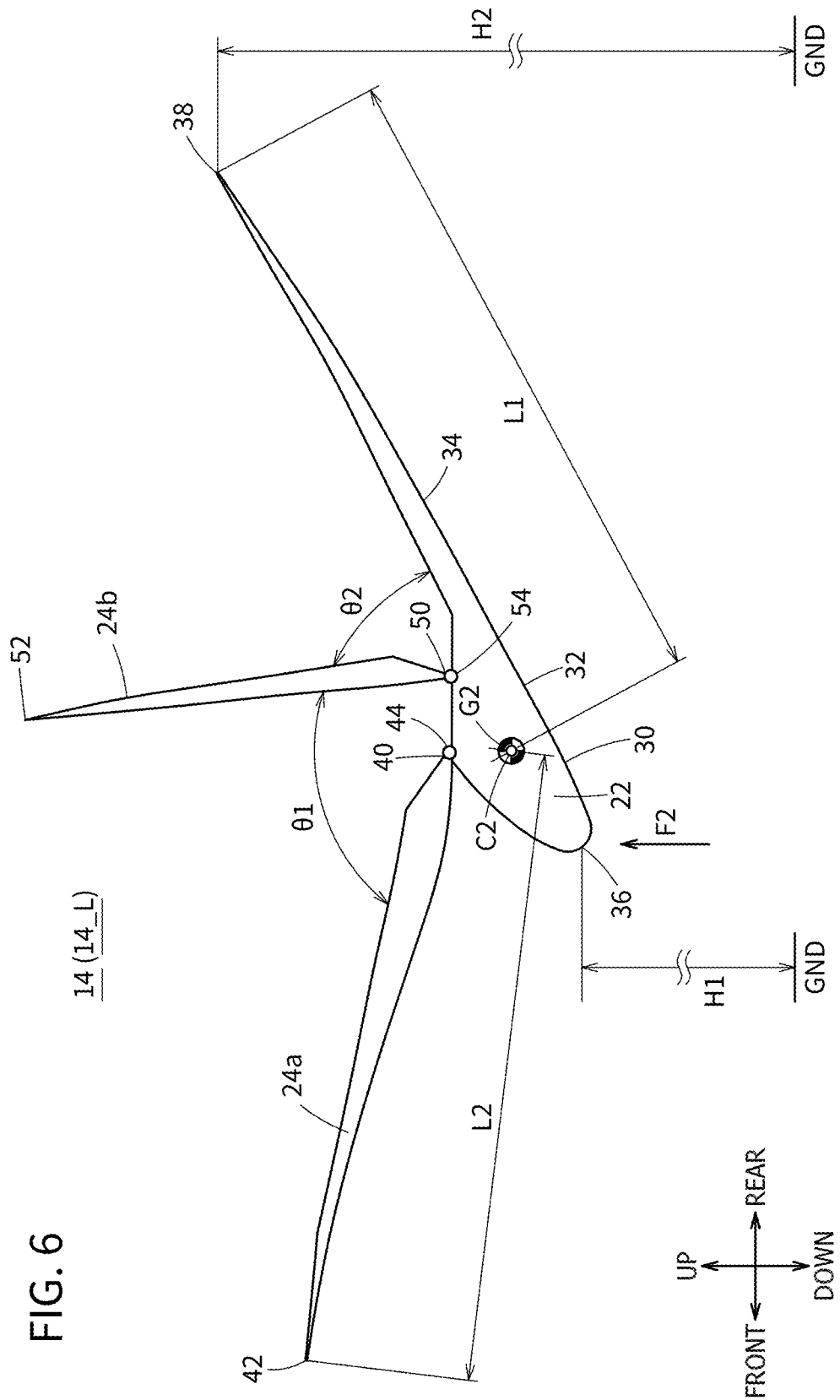
FIG. 6 is a diagram showing the state of the wing in the case where the flying object is descending.

FIG. 5 is a diagram showing the state of the wing 14 in the case where the flying object 10 is flying in the horizontal direction. FIG. 6 is a diagram showing the state of the wing 14 in the case where the flying object 10 is descending. In FIG. 6, the wing 14 is inclined forward from the state shown in FIG. 4.

The flying object 10 can fly in the horizontal direction at an altitude equal to or higher than a predetermined altitude and can descend from the altitude equal to or higher than the predetermined altitude. In the case where the flying object 10 flies in the horizontal direction, the wing 14 is brought into the superposed state as shown in FIG. 5. In the case where the flying object 10 descends, the wing 14 is brought into the deployed state as shown in FIG. 6.

As shown in FIG. 5, in the case where the wing 14 is in the superposed state, the proximal end 40 of the first deployable wing portion 24*a* is located forward of a distal end (protruding end) 42 of the first deployable wing portion 24*a* in the front-rear direction. In the case where the wing 14 is in the superposed state, the proximal end 50 of the second deployable wing portion 24*b* is located forward of a distal end (protruding end) 52 of the second deployable wing portion 24*b* in the front-rear direction.

As shown in FIG. 6, in the case where the wing 14 is in the deployed state, at least the distal end 42 of the first deployable wing portion 24*a* is located forward of the proximal end 40 of the first deployable wing portion 24*a*. In the case where the wing 14 is in the deployed state, the distal end 52 of the second deployable wing portion 24*b* is located above the proximal end 50 of the second deployable wing portion 24*b* in the vertical direction. Preferably, the extending direction of the second deployable wing portion 24*b* lies along the vertical direction. More preferably, the extending direction of the second deployable wing portion 24*b* is the vertical direction.

As shown in FIG. 6, in the case where the wing 14 is in the deployed state, an angle θ1 formed by the first deployable wing portion 24*a* and the second deployable wing portion 24*b* is substantially equal to an angle θ2 formed by the fixed wing portion 22 and the second deployable wing portion 24*b*, but the present disclosure is not limited thereto.

As shown in FIG. 6, in the case where the wing 14 is in the deployed state, a height position H1 of the leading edge 36 of the fixed wing portion 22 in the vertical direction is lower than a height position H2 of the trailing edge 38 of the fixed wing portion 22 in the vertical direction.

As shown in FIG. 5, in the case where the flying object 10 is flying in the horizontal direction with the wing 14 in the superposed state, a uniform flow F1 of air flowing from the front to the rear as viewed from the flying object 10 acts on the periphery of the wing 14. Accompanying the action of the uniform flow F1 of air, the resultant force of air acts on the center of pressure (the center of wind pressure) C1 of the wing 14. The center of gravity G1 of the flying object 10 when the wing 14 is in the superposed state and the center of pressure C1 of the wing 14 in the superposed state overlap each other in a side view.

As shown in FIG. 6, in the case where the flying object 10 is descending with the wing 14 in the deployed state, a uniform flow F2 of air flowing from the bottom to the top as viewed from the flying object 10 acts on the periphery of the wing 14.

Accompanying the action of the uniform flow F2 of air, the resultant force of air acts on the center of pressure (the center of wind pressure) C2 of the wing 14. The center of gravity G2 of the flying object 10 when the wing 14 is in the deployed state and the center of pressure C2 of the wing 14 in the deployed state overlap each other in the side view. It should be noted that the center of gravity G2 is located forward of the center of gravity G1. That is, the center of pressure C2 is located forward of the center of pressure C1.

As shown in FIG. 6, for example, the distance from the center of gravity G2 of the flying object 10 to the trailing edge 38 of the fixed wing portion 22 is defined as L1, and the distance from the center of gravity G2 of the flying object 10 to the distal end 42 of the first deployable wing portion 24*a* is defined as L2. In the deployed state, the distance L1 and the distance L2 are equal to each other.

The trailing edge 38 of the fixed wing portion 22, which is the starting point (or the end point) of the distance L1, indicates the trailing edge 38 of any portion of the fixed wing portion 22 in the width direction thereof. For example, the trailing edge 38 of the fixed wing portion 22 may be the trailing edge 38 of the proximal end portion of the fixed wing portion 22 in the width direction thereof, or may be the trailing edge 38 of the distal end portion of the fixed wing portion 22 in the width direction thereof. The distal end 42 of the first deployable wing portion 24*a*, which is the starting point (or the end point) of the distance L2, indicates the distal end 42 of any portion of the first deployable wing portion 24*a* in the width direction thereof. For example, the distal end 42 of the first deployable wing portion 24*a* may be the distal end 42 of the proximal end portion of the first deployable wing portion 24*a* in the width direction thereof, or may be the distal end 42 of the distal end portion of the first deployable wing portion 24*a* in the width direction thereof.

4. ADVANTAGEOUS EFFECTS OF PRESENT EMBODIMENT

According to the present embodiment, by increasing the area of the planform of the wing 14 by bringing the wing 14 into the deployed state, it is possible to increase the air resistance acting on the wing 14 when the flying object 10 descends downward in the vertical direction. That is, according to the present embodiment, when the uniform flow F2 of air flowing from the bottom to the top as viewed from the flying object 10 is acting, the air resistance acting on the wing 14 can be increased. Therefore, according to the present embodiment, the speed of the flying object 10 descending downward in the vertical direction can be suppressed.

According to the present embodiment, in the deployed state of the wing 14, the moment acting on the flying object 10 can be suppressed, and the attitude of the flying object 10 can be stabilized.

According to the present embodiment, in the case where the flying object 10 flies in the horizontal direction, the air resistance acting on the wing 14 can be reduced by bringing the wing 14 into the superposed state. Therefore, according to the present embodiment, the energy consumption of the flying object 10 can be suppressed.

As described above, according to the present embodiment, it is possible to provide a flying object that can fly suitably.

5. SUPPLEMENTARY NOTES

The following supplementary notes are further disclosed in relation to the above-described embodiment.

Supplementary Note 1

The flying object (10) of the present disclosure includes: the fuselage (12); the wing (14) extending laterally from the fuselage and configured to generate lift during cruising; and the thrust generation unit (16) configured to generate thrust, wherein the wing includes the fixed wing portion (22) fixed to the fuselage, and the deployable wing portion (24) deployable forward in the front-rear direction from the fixed wing portion, and the area (S2) of the planform of the wing in a deployed state in which the deployable wing portion is deployed forward in the front-rear direction is larger than the area (S1) of the planform of the wing in a superposed state in which the deployable wing portion is superposed on the fixed wing portion.

According to the above configuration, by increasing the area of the planform of the wing by bringing the wing into the deployed state, it is possible to increase the air resistance acting on the wing when the flying object descends downward in the vertical direction. That is, according to the above configuration, when the uniform flow (F2) of air flowing from the bottom to the top as viewed from the flying object is acting, the air resistance acting on the wing can be increased. Therefore, according to the above configuration, the speed of the flying object descending downward in the vertical direction can be suppressed.

Supplementary Note 2

In the flying object according to Supplementary Note 1, the center of gravity (G1) of the flying object when the wing is in the superposed state and the center of pressure (C1) of the wing in the superposed state may overlap each other in a side view, and the center of gravity (G2) of the flying object when the wing is in the deployed state and the center of pressure (C2) of the wing in the deployed state may overlap each other in the side view.

According to the above configuration, in the deployed state of the wing, the moment acting on the flying object can be suppressed, and the attitude of the flying object can be stabilized.

Supplementary Note 3

In the flying object according to Supplementary Note 1, in the deployed state, at least a part of the deployable wing portion may be located forward of the leading edge (36) of the fixed wing portion in the front-rear direction.

According to the above configuration, when the uniform flow of air flowing from the bottom to the top is acting, the air resistance acting on the wing can be increased. Therefore, according to the above configuration, the speed of the flying object descending downward in the vertical direction can be suppressed.

Supplementary Note 4

In the flying object according to Supplementary Note 1, the wing may be brought into the superposed state when the flying object flies in the horizontal direction, and may be brought into the deployed state when the flying object descends.

According to the above configuration, in the case where the flying object flies in the horizontal direction, the air resistance acting on the wing can be reduced by bringing the wing into the superposed state. Therefore, according to the above configuration, the energy consumption of the flying object can be suppressed.

Supplementary Note 5

In the flying object according to Supplementary Note 1, the deployable wing portion may include the first deployable wing portion (24a) and the second deployable wing portion (24b), and the angle (θ1) formed by the first deployable wing portion and the second deployable wing portion may be equal to the angle (θ2) formed by the fixed wing portion and the second deployable wing portion.

Supplementary Note 6

In the flying object according to Supplementary Note 1, when the flying object descends, the height position (H1) of the leading edge of the fixed wing portion in the vertical direction may be lower than the height position (H2) of the trailing edge (38) of the fixed wing portion in the vertical direction.

Supplementary Note 7

In the flying object according to Supplementary Note 1, in the deployed state, the distance (L1) from the center of gravity of the flying object to the trailing edge of the fixed wing portion may be equal to the distance (L2) from the center of gravity of the flying object to the distal end (42) of the deployable wing portion.

Supplementary Note 8

In the flying object according to Supplementary Note 1, the deployable wing portion may be deployable forward in the front-rear direction from the fixed wing portion by rotating about the rotation shaft extending in the width direction of the fuselage.

Although the present disclosure has been described in detail, the present disclosure is not limited to the above-described individual embodiments. Various additions, replacements, modifications, partial deletions, and the like can be made to these embodiments without departing from the essence and gist of the present disclosure, or without departing from the essence and gist of the present disclosure derived from the claims and equivalents thereof. Further, these embodiments can also be implemented in combination. For example, in the above-described embodiments, the order of operations and the order of processes are shown as examples, and are not limited to these. Furthermore, the same applies to a case where numerical values or mathematical expressions are used in the description of the above-described embodiments.

The invention claimed is:

1. A flying object comprising:
   a fuselage;
   a wing extending laterally from the fuselage and configured to generate lift during cruising; and
   a thrust generation unit configured to generate thrust,
   wherein the wing includes a fixed wing portion fixed to the fuselage, and a deployable wing portion deployable forward in a front-rear direction from the fixed wing portion,
   an area of a planform of the wing in a deployed state in which the deployable wing portion is deployed forward in the front-rear direction is larger than an area of the planform of the wing in a superposed state in which the deployable wing portion is superposed on the fixed wing portion, and
   in the deployed state, at least a part of the deployable wing portion is locatable forward of a leading edge of the fixed wing portion in the front-rear direction.

2. The flying object according to claim 1, wherein
   a center of gravity of the flying object when the wing is in the superposed state and a center of pressure of the wing in the superposed state overlap each other in a side view, and a center of gravity of the flying object when the wing is in the deployed state and a center of pressure of the wing in the deployed state overlap each other in the side view.

3. The flying object according to claim 1, wherein
the wing is brought into the superposed state when the flying object flies in a horizontal direction, and is brought into the deployed state when the flying object descends.

4. The flying object according to claim 1, wherein
when the flying object descends, a height position of the leading edge of the fixed wing portion in a vertical direction is lower than a height position of a trailing edge of the fixed wing portion in the vertical direction.

5. The flying object according to claim 1, wherein
in the deployed state, a distance from a center of gravity of the flying object to a trailing edge of the fixed wing portion is equal to a distance from the center of gravity of the flying object to a distal end of the deployable wing portion.

6. The flying object according to claim 1, wherein
the deployable wing portion is deployable forward in the front-rear direction from the fixed wing portion by rotating about a rotation shaft extending in a width direction of the fuselage.

7. A flying object comprising:
a fuselage;
a wing extending laterally from the fuselage and configured to generate lift during cruising; and
a thrust generation unit configured to generate thrust,
wherein the wing includes a fixed wing portion fixed to the fuselage, and a deployable wing portion deployable forward in a front-rear direction from the fixed wing portion,
an area of a planform of the wing in a deployed state in which the deployable wing portion is deployed forward in the front-rear direction is larger than an area of the planform of the wing in a superposed state in which the deployable wing portion is superposed on the fixed wing portion, the deployable wing portion includes a first deployable wing portion and a second deployable wing portion, and
an angle formed by the first deployable wing portion and the second deployable wing portion is equal to an angle formed by the fixed wing portion and the second deployable wing portion.

8. The flying object according to claim 7, wherein
a center of gravity of the flying object when the wing is in the superposed state and a center of pressure of the wing in the superposed state overlap each other in a side view, and a center of gravity of the flying object when the wing is in the deployed state and a center of pressure of the wing in the deployed state overlap each other in the side view.

9. The flying object according to claim 7, wherein
the wing is brought into the superposed state when the flying object flies in a horizontal direction, and is brought into the deployed state when the flying object descends.

10. The flying object according to claim 7, wherein
when the flying object descends, a height position of a leading edge of the fixed wing portion in a vertical direction is lower than a height position of a trailing edge of the fixed wing portion in the vertical direction.

11. The flying object according to claim 7, wherein
in the deployed state, a distance from a center of gravity of the flying object to a trailing edge of the fixed wing portion is equal to a distance from the center of gravity of the flying object to a distal end of the deployable wing portion.

12. The flying object according to claim 7, wherein
the deployable wing portion is deployable forward in the front-rear direction from the fixed wing portion by rotating about a rotation shaft extending in a width direction of the fuselage.

* * * * *